United States Patent
Biermann et al.

[11] 3,892,471
[45] July 1, 1975

[54] ELECTRODES FOR LIQUID CRYSTAL COMPONENTS

[75] Inventors: Manfred Biermann; Bernd Brauer; Wolfgang Heidborn; Bernd Monno; Klaus Thiessen, all of Berlin, Germany

[73] Assignee: VEB Werk fur Fernsehelektronik, Berlin, Germany

[22] Filed: Nov. 2, 1973

[21] Appl. No.: 412,364

[30] Foreign Application Priority Data
Nov. 6, 1972 Germany.............................. 166682

[52] U.S. Cl............................ 350/160 LC; 313/517
[51] Int. Cl. ............................................... G02f 1/28
[58] Field of Search .......... 350/160 LC; 313/109.5, 313/517; 250/331

[56] References Cited
UNITED STATES PATENTS
3,600,060  8/1971  Churchill et al.............. 350/160 LC
3,807,831  4/1974  Soref........................... 350/160 LC Primary Examiner—James W. Lawrence
Assistant Examiner—Davis L. Willis
Attorney, Agent, or Firm—Nolte and Nolte

[57] ABSTRACT

A liquid crystal display device having a liquid crystal layer between a pair of electrodes. In one arrangement, one of the electrodes is transparent and the other electrode is either transparent or reflective. One of the electrodes is shaped to divide the display region into small partial regions which are not distinguishable from a normal viewing distance. In another arrangement, the electrodes have a comb-like configuration and are arranged to intermesh with each other to develop a lateral electric field in the liquid crystal material between the electrodes.

13 Claims, 6 Drawing Figures

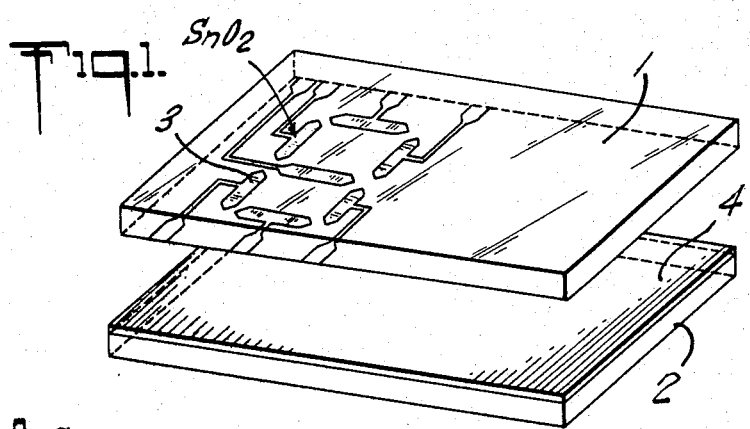
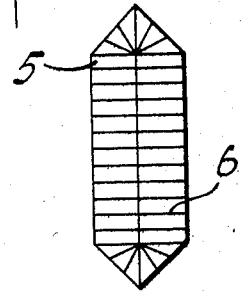
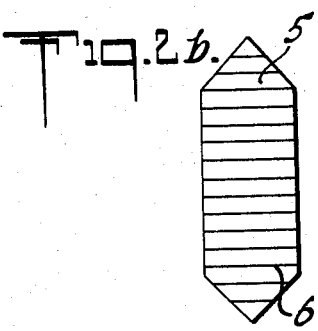
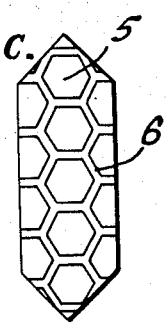
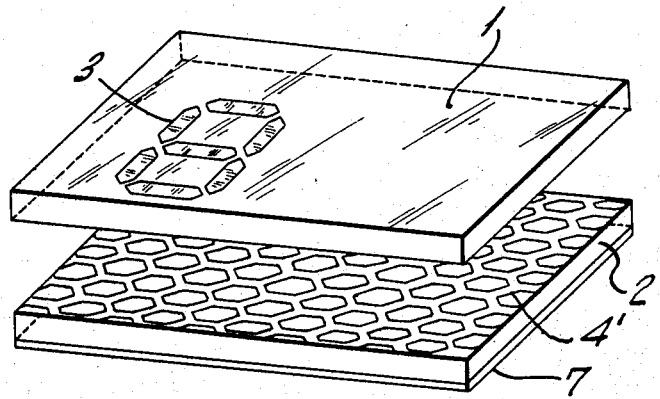
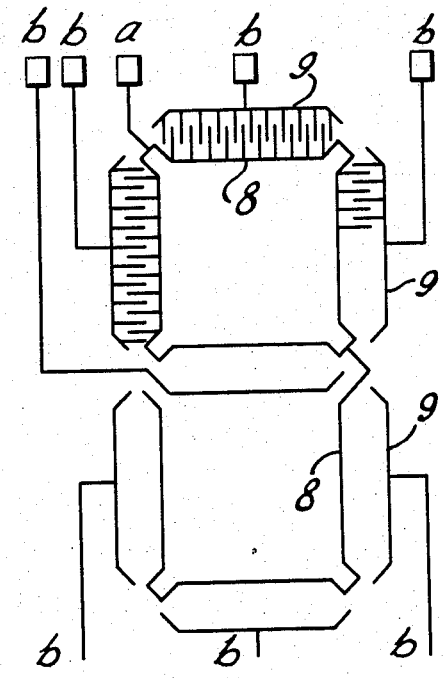

ELECTRODES FOR LIQUID CRYSTAL COMPONENTS

This invention relates to liquid crystal display devices, and is more particularly directed to the design of electrodes of liquid crystal display devices of the type in which the optical properties of liquid crystal materials are utilized for the display of alpha numeric characters. The liquid crystal materials are susceptible to the influence of electrical or magnetic fields, such as the dynamic scatter effect and change of birefringence or optical activity. The invention is particularly adaptable for use in liquid crystal devices in which the display areas have relatively large dimensions.

Liquid crystal display devices are generally comprised of a thin layer of a liquid crystal material positioned between a pair of closely spaced substrate support plates. In these devices, the substrate support plate designed to be directed toward a viewer is transparent, for example being of glass or a transparent plastic material, and this support plate is coated with an optically transparent conductive material, such as tin dioxide. This electrode is also usually shaped in the form of a sign or symbol that is to be displayed, the electrode corresponding to each individual area to be displayed being connected by way of suitable leads to an external energizing circuit. A back electrode is provided on the other substrate support plate, the back electrode being comprised either of a tin dioxide layer on the other substrate support, or another conductive material such as aluminum or silver. The back electrode is also connected to the external voltage source. When a material such as aluminum or silver is employed for the back electrode, this electrode serves the additional function of being a reflective element in the device. An alpha numeric sign or symbol may thus be displayed on the device, in dependence upon the selective energization of the individual front electrodes of the device, due to the change of optical properties of the liquid crystal material. In the operation of such devices, however, it has been found that as the area of the electrodes is increased, the irregularities of the scatter effect increase substantially, with the consequent undesirable result that the individual regions within an energized electrode area are displayed with different brightnesses.

In the past, in order to promote uniformity of the optical effect, the electrodes of the devices have been rubbed before assembly of the devices in order to orient the liquid crystal material. This technique is employed in order to orient the nematic liquid crystal layer in its preferred direction parallel to the rubbing direction. This technique has only a limited effect, however, and increases the effort required to fabricate the devices as well as the cost of the devices.

The invention is therefore directed to the provision of a liquid crystal display device in which visibly uniform light scattering is obtained in a simple manner, and in which the uniform scattering of light is effective over relatively large electrode areas.

Briefly stated, in accordance with the invention, the areas of the electrode layers are divided into many small partial areas of a size such that the separate areas are not distinguishable from a normal viewing distance. In this arrangement, high field strengths occur at the edges of the electrodes, and an especially intense hydrodynamic circulation occurs in the liquid crystal substance due to the resultant field and homogeniaty, so that a vigorous scatter effect results in these partial regions that is uniform throughout the entire display area.

The partial regions may have any desired shape. For example, they may be rectangular, square, round or hexagonal. It is essential, however, that the partial areas are spaced from each other a very small distance, preferably 10 to 100 microns, so that no individual areas are discernable from a normal viewing distance, thereby imparting to the eye of the viewer the impression that there is only a single uniform display area.

The electrically conductive borders, surrounding the non-conductive individual partial regions of the electrode area may be of a transparent conductive electrode material such as tin oxide. If these border areas are of sufficiently small size, however, a transparent conductive electrode material is not necessary, in which case any conductive material, such as metal or carbon, can be employed for the conductive portion of the electrode area without any major impairment of the transparent characteristics of the device.

In a further embodiment of the invention, both of the electrodes may be arranged on the same substrate support, i.e., in a common plane. In this arrangement, the electrodes which have shapes corresponding to the shapes of the symbol to be displayed, are arranged so that they intermesh with each other in comb-like fashion, so that the spacing between the electrodes is of a small size, preferably from about 10 to 200 microns. The liquid crystal substance is disposed between the electrodes, whereby the lateral field that develops between the electrodes in the intermediate vicinity of the energized area produces the desired display. The larger volume of the liquid crystal material, which is substantially not influenced by the field, serves as a reservoir of the liquid crystal material.

In accordance with the invention it has been found that the transparence characteristic of a liquid crystal device with respect to the increase and linearity of the transparancy characteristic as a function of the applied voltage, in liquid crystal devices utilizing the dynamic scatter effect, is such that an improved reproduction of brightness gradations is possible by suitable subdivision of the electrode regions. This results from the fact that, with constant thickness of the liquid crystal layer, the transparancy characteristic becomes flatter with increases in the size of the non-conductive partial regions defined by the conductive portions of the electrodes.

The invention provides the major advantage, however, in that a uniform optical effect is achieved in a relatively simple manner, and that the uniform optical effect is obtained even though the liquid crystal devices have relatively large dimensions.

In order that the invention will be more clearly understood, it will now be disclosed in greater detail with reference to the accompanying drawings, in which:

FIG. 1 is an exploded perspective view, in simplified form, of a conventional liquid crystal display device;

FIGS. 2a, 2b and 2c are plan views of three forms of electrode elements that may be employed in the liquid crystal device of FIG. 1, in accordance with the invention;

FIG. 3 is an exploded perspective view, in simplified form, of a liquid crystal display device in accordance with another embodiment of the invention; and FIG. 4 is a simplified illustration of the electrode configuration of a liquid crystal display device in accordance with a further embodiment of the invention.

Referring now to FIG. 1, a conventional liquid crystal display device is comprised of a front substrate support plate 1 and a rear substrate support plate 2, these support plates preferably being of glass. A tin oxide electrode 3 is provided on the front support plate 1, this electrode being segmented in accordance with the sign or symbol to be displayed. In the illustrated liquid crystal display device, the electrode is in the form of a seven segment display, for example for the display of the numbers 0 to 9, consisting of seven elements 3, which are adapted to be connected in conventional manner by way of leads to a suitable external energizing circuit. The tin dioxide elements 3 are of course transparent. A back electrode 4 is provided on the rear support plate 2, this electrode comprising for example a highly reflective metallic coating, and also being adapted to be connected to an external energizing circuit. A liquid crystal layer, not identified by reference numeral in FIG. 1, is conventionally provided between the two coated substrate plates 1 and 2. The transparency of the different areas of the liquid crystal area, depending upon the energization of the electrodes 3 and 4, enables the display of the desired signs or alpha numeric characters.

FIGS. 2a, 2b and 2c illustrate various forms of conductive electrodes, in accordance with the invention, that may be employed for the elements 3 of the device of FIG. 1. In each of these arrangements, small nonconductive partial regions 5 of the electrode area are bounded by conductive webs 6, thereby dividing the electrode areas into a plurality of small partial regions 5. The webs may be fabricated of tin dioxide, and hence be transparent. When the widths of the webs 6, which bound the partial regions 5, are small in relation to the widths or diameters of the partial regions 5, these webs 6 may be comprised of a metallic material or carbon, without substantially impairing the transparency characteristics of the display device. In FIG. 2a the partial areas in the center portion of the element are generally rectangular, with the generally triangular end portions of the electrode being divided into small triangular areas 5, whereby the outline of each partial area is defined by the conductive webs 6. In the arrangement of FIG. 2b, the conductive web 6 of the element is in the form of a conductive element defining the outer limits of the element, with parallel conductors extending across the element throughout its extent to subdivide the element into the partial areas 5. In FIG. 2c the partial areas 5 are hexagonal, with the conductive web 6 having a honeycomb shape to define the areas 5. It will be obvious, of course, that many other forms and shapes of electrodes may alternatively be employed in accordance with the invention, depending for example upon the shape of the display area.

In the arrangement of FIG. 3, the back electrode 4' on the plate 2 is in the form of a continuous honeycomb shaped layer of tin oxide defining nonconductive hexagonal partial regions. The support plate 2, which may be a thin glass layer, is provided with a reflecting metallic coating 7 on its back side. In order to increase the sturdiness of the device, the thin glass plate 2 may be glued to another glass plate, sandwiching the layer 7 therebetween. The front electrode 3 on the front support plate 1 may, if desired, be of conventional nature, or it may be in a form of element such as illustrated in FIGS. 2a–2c.

While the partial nonconductive areas of the electrodes are illustrated in FIGS. 2 and 3 in enlarged form for clarity, it is of course to be understood that these areas are relatively small, having widths or diameters preferably from 10 to 100 microns. In a further embodiment of the invention, as illustrated in FIG. 4, the electrodes are arranged in a common plane. For example, the two electrodes of each element of the display may be formed on a common surface of the same substrate plate. The electrodes, as illustrated in FIG. 4, have comblike shapes, and the electrodes corresponding to each element of the display are intermeshed with one another. The overall configuration of each element of the display is shaped in accordance with the symbol or sign to be displayed, for example as illustrated in FIG. 4 seven elements of pairs of intermeshed electrodes being arranged to form a seven segment display for display of alpha numeric characters.

As illustrated in FIG. 4, a common electrode 8 is provided, common to each of the display segments, and connected to a terminal a. The electrode 8 has a comblike configuration at each element, and intermeshes with a separate opposing comblike electrode 9 at each element of the display. The electrodes 9 are connected to separate energizing terminals b. Upon energization of each element by application of voltages thereto, the lateral field develops in the immediate vicinity of only one area enveloping the liquid crystal material, i.e. the area between the respective electrodes, and the volume of liquid crystal material outside of this area is largely uninfluenced by the field, so that this volume serves as a reservoir of the material. The spacings between the electrodes 8 and 9 of each element is small, preferably from about 10 to 200 microns. In the arrangement of FIG. 4 the electrodes may be of tin oxide.

While the invention has been disclosed and described with reference to a limited number of embodiments, it will be apparent that many variations and changes may be made therein without departing from the invention, and it is therefore intended in the following claims to cover each such variation and modification as falls within the true spirit and scope of the invention.

What is claimed is:

1. In a liquid crystal display device having first and second electrodes, both of the electrodes being optically transparent, and wherein a layer of a liquid crystal material is provided between the electrodes, the improvement comprising first and second spaced apart substrate support plates, the first and second electrodes being on said first and second plates, respectively, and wherein the area of one of said first and second electrodes is separated into a plurality of small partial regions of a size not discernible from a normal viewing distance of said device.

2. The device of claim 1 wherein said partial regions are nonconductive regions bounded by conductive electrode regions, said partial regions having widths of between 10 and 100 microns.

3. The device of claim 2 wherein the conductive portions of said electrodes are of a non-transparent material, said conductive portions forming webs having widths small in proportion to the widths of said nonconductive partial regions.

4. The device of claim 1 wherein said small partial regions have dimensions whereby the scattering effect voltage characteristic of the liquid crystal material is influenced.

5. In a liquid crystal display device having first and second electrodes, one of the electrodes being optically transparent and the other being optically reflective, and wherein a layer of a liquid crystal material is provided between the electrodes, the improvement comprising first and second spaced apart substrate support plates, the first and second electrodes being on said first and second plates, respectively, and wherein the area of one of said first and second electrodes is separated into a plurality of small partial regions of a size not discernible from a normal viewing distance of said device.

6. The device of claim 5 wherein said partial regions are nonconductive regions bounded by conductive electrode regions, said partial regions having widths of between 10 and 100 microns.

7. The device of claim 6 wherein the conductive portions of said electrodes are of a non-transparent material, said conductive portions forming webs having widths small in proportion to the widths of said nonconductive partial regions.

8. The device of claim 5 wherein said small partial regions have dimensions whereby the scattering effect voltage characteristic of the liquid crystal material is influenced.

9. In a liquid crystal display device of the type having a layer of a liquid crystal material between first and second electrodes to optically influence said material, the improvement comprising first and second substrate supports, the first and second electrodes being positioned on said first and second supports, respectively, and wherein said electrodes are shaped to define partial regions in a display area that are not discernible at a normal viewing distance from said device.

10. The display device of claim 9 wherein one of said electrodes is comprised of a web of conductive material surrounding partial nonconductive areas, said nonconductive areas having widths of between 10 and 100 microns.

11. The display device of claim 10 wherein said web is formed of a non-transparent conductive material, said web having a width that is small with respect to the width of said partial areas.

12. In a liquid crystal display device of the type having first and second electrodes and wherein a layer of liquid crystal material is provided between the support plates, whereby the optical properties of the liquid crystal material are dependent upon the potential between the first and second electrodes to provide a visible display; the improvement comprising first and second spaced apart substrate support plates, the first and second electrodes being on said first and second plates, respectively, and wherein one of the electrodes is formed with a plurality of partial non-conductive regions having dimensions thereacross from 10 to 100 microns, said one electrode being comprised of a conductive web bounding said non-conductive regions.

13. The liquid crystal display device of claim 12 wherein said conductive web is transparent.

* * * * *